June 3, 1930.  R. W. CHALMERS  1,761,969
EXPORT SHIPPING DEVICE
Filed Sept. 4, 1926  2 Sheets-Sheet 1

June 3, 1930.   R. W. CHALMERS   1,761,969
EXPORT SHIPPING DEVICE
Filed Sept. 4, 1926   2 Sheets-Sheet 2

Inventor
Raymond W. Chalmers
By Blackmore, Spencer & Flint
Attorneys

Patented June 3, 1930

1,761,969

UNITED STATES PATENT OFFICE

RAYMOND W. CHALMERS, OF HIGHLAND PARK, MICHIGAN, ASSIGNOR TO GENERAL MOTORS CORPORATION, OF DETROIT, MICHIGAN, A CORPORATION OF DELAWARE

EXPORT SHIPPING DEVICE

Application filed September 4, 1926. Serial No. 133,714.

This invention relates to mechanism for packing and shipping heavy and bulky articles. It has been devised to facilitate the safe shipment of motor vehicles.

A primary object of the invention is to provide cheap and readily applied means to secure a vehicle chassis in a shipping box.

A further object is to provide convenient means for securing the axles of the vehicle to the box.

Other objects will appear from the following description.

In the drawing accompanying the description:

Figure 6 illustrates the detail in section.

Figure 1:
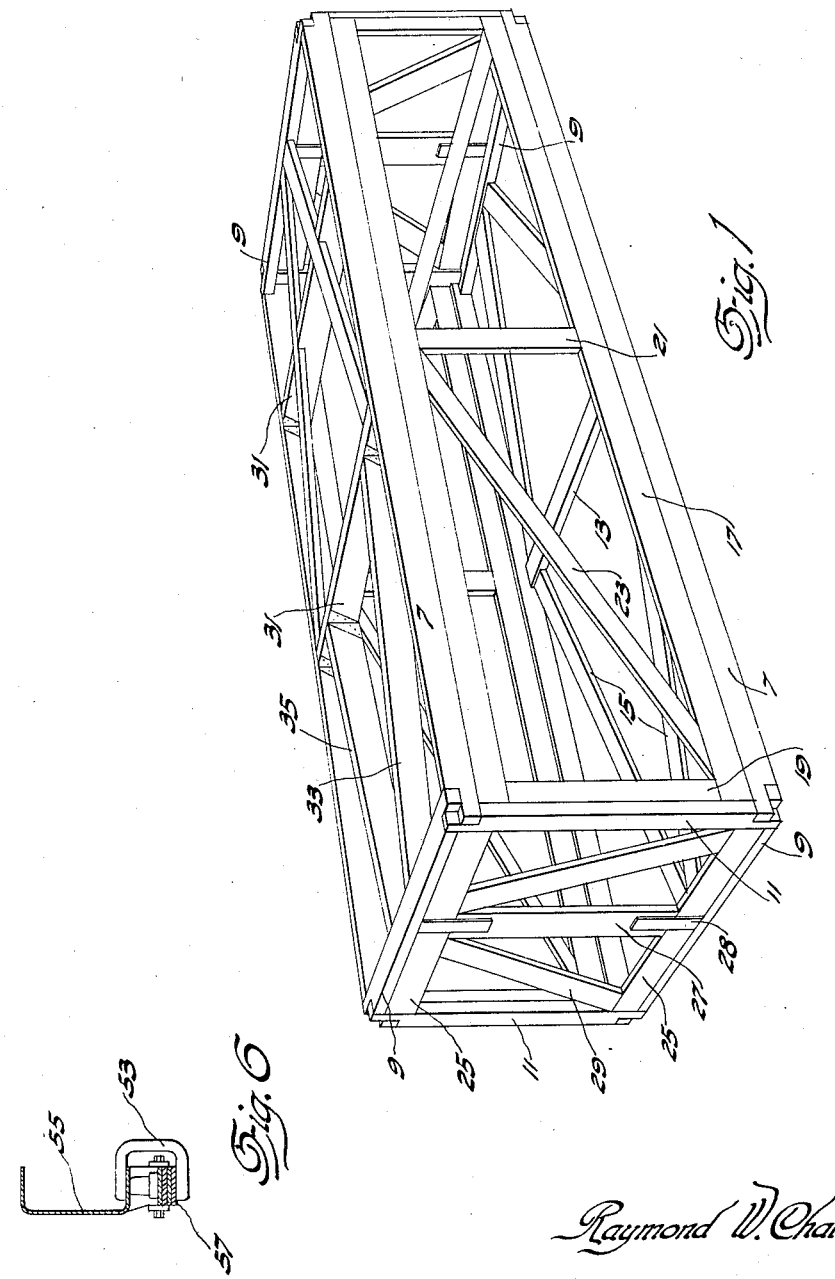
Figure 1 is a perspective of the shipping box.

Referring by reference characters to the several figures of the drawing, numeral 7 represents four longitudinal frame members. Cross members 9 are also shown as four in number, and there are four uprights 11. The bottom of the box is made up of two parts 9, an intermediate parallel girth member 13 and diagonal braces 15. Upon the bottom are side members having the longitudinal frame member 7 supplemented by bracing members 17 and 19, together with girth members 21 and diagonal braces 23. The end members are made up of the uprights 11, transverse members 25, girth members 27, the latter secured to the members 25 by straps 28 and diagonal braces 29. To constitute the top there are the transverse members 9 and supplemental members 31. There are also provided diagonal brace members 33 secured by metal fittings 35, as shown in Figure 1. The ends of members 31 are also provided with metal fittings by which they may be secured to side members 7. The corners of the box are made rigid and strong by cutting away the ends of the frame members 7, 9 and 11 and inter-engaging the tenons and shoulders, as clearly shown in Figure 1.

Figure 4:
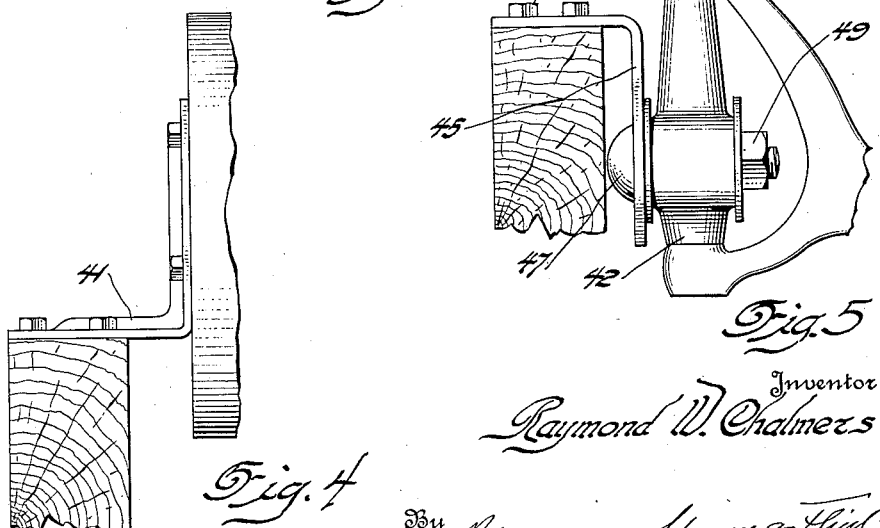
Figure 4 is a view in side elevation of the the bracket by which the rear end of the vehicle is supported.

The vehicle chassis intended for shipment is mounted in the box without the wheels, top, windshield or steering wheel. It is customary to support such a vehicle by blocks mounted on the bottom of the shipping box, the blocks to support the axles. In accordance with my invention, I support the vehicle in the following manner. A right angle bracket 41 (see Figure 4) is provided on its vertical face with a plurality of openings for bolts, four being shown in the drawing. From the rear axle housing of the car there are removed the cap screws which hold to the brake supporting disc of the axle a plate which latter serves to hold the outer ball bearing within a recess in the said brake supporting disc. The said plate, the bearing, and the wheel and axle are removed. The cap screws by which the plate was held are now employed to secure the vertical arm of the bracket 41 to the aforesaid brake supporting disc of the rear axle housing. The horizontal face of the bracket may then be secured by fastening means to the box, preferably to a longitudinal frame member. In this way the rear end of the car is rigidly supported within the box.

Figure 2:
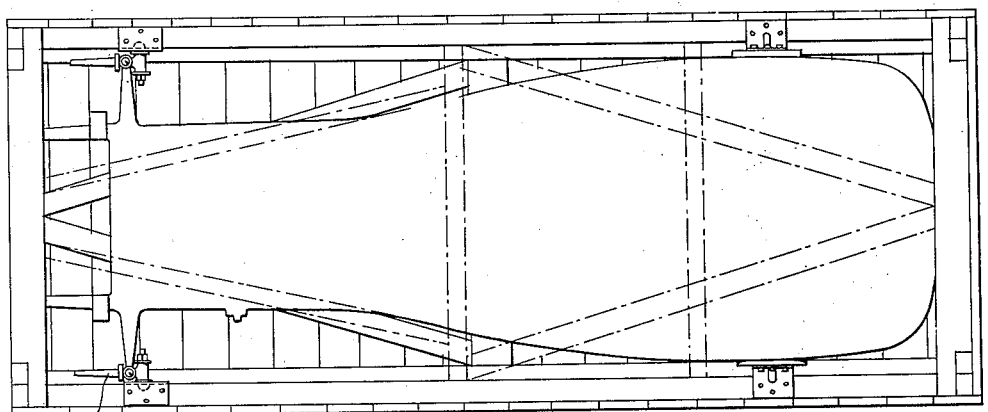
Figure 2 is a plan view of the box containing the vehicle chassis, with the cover removed.
Figure 3:
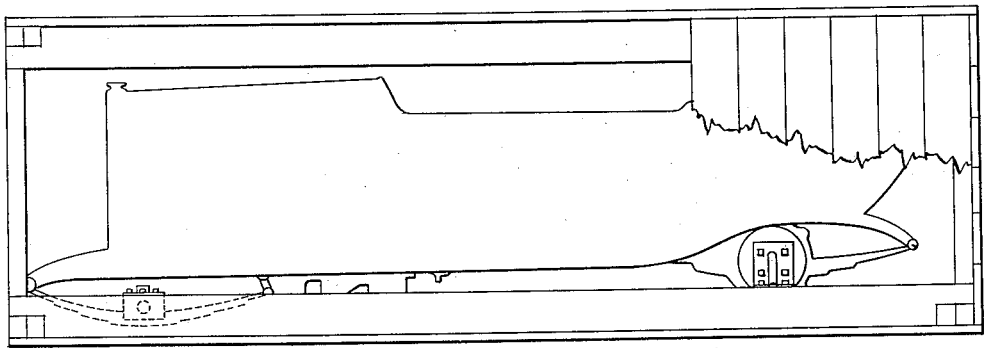
Figure 3 is a side view partly broken away.
Figure 5:
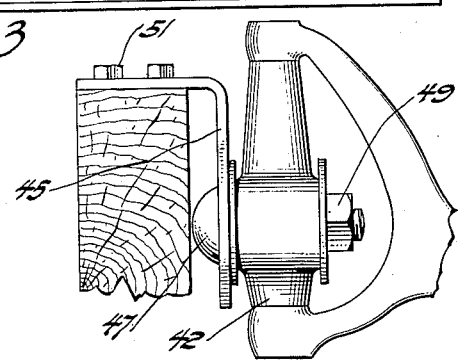
Figure 5 is a similar view showing the means for mounting the front end.

At the front end a somewhat similar arrangement is provided. From the steering knuckles 42 the wheels are removed, and also the steering rods are withdrawn from the apertures on the sides of the knuckles opposite the wheel spindles. The knuckle is then turned so that the wheel spindle 43 extends lengthwise of the frame, as clearly shown in Figure 2. This results in a transverse position of the opening in the knuckle through which the steering rod is usually passed. An angle bracket 45 is provided, see Figure 5, having a bolt 47 projecting from one face, which bolt may be inserted into the steering rod opening of the knuckle, the bolt being held in place by a nut 49. The bracket is secured to the frame member of the box by fastening means 51. By the provision of these simple brackets the vehicle is firmly supported in such a shipping box as is shown in Figure 1.

It may be desired to hold the spring under the compression while the vehicle is being shipped. For that purpose a U-shaped clip 53 is shown in Figure 6 as engaging over the lower arm of the channel member 55 of the chassis. The lower arm of the member 53 engages under the spring 57 of the vehicle. It will be understood, of course, that the spring and the frame member 55 are first drawn together whereupon the clip 53 is applied.

I claim:

In combination, a shipping box, a vehicle having a rear axle housing with terminal flanges and with pivoted steering knuckles provided with apertures for the reception of steering arms, a plurality of brackets secured to the opposite side walls of said box, said vehicle having its wheels and rear axles removed and its steering knuckles turned through substantially 90°, means to secure said rear axle housing flanges to certain of said brackets and other means to secure said steering knuckles to other brackets, said other means extending through the apertures of said steering knuckles.

In testimony whereof I affix my signature.

RAYMOND W. CHALMERS.